(12) United States Patent
Lake et al.

(10) Patent No.: US 11,340,683 B2
(45) Date of Patent: May 24, 2022

(54) POWER MANAGEMENT CIRCUITRY FOR CONTROLLING A POWER STATE TRANSITION BASED ON A PREDETERMINED TIME LIMIT

(71) Applicant: Intel Corporation, Santa Clara, CA (US)

(72) Inventors: Christopher Lake, Folsom, CA (US); Vaibhav Shankar, Hillsboro, OR (US); Prashant Kodali, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 16/833,131

(22) Filed: Mar. 27, 2020

(65) Prior Publication Data

US 2021/0303053 A1 Sep. 30, 2021

(51) Int. Cl.
*G06F 1/3206* (2019.01)
*G06F 1/3296* (2019.01)

(52) U.S. Cl.
CPC .......... *G06F 1/3206* (2013.01); *G06F 1/3296* (2013.01)

(58) Field of Classification Search
CPC .............................. G06F 1/3206; G06F 1/3296
See application file for complete search history.

(56) References Cited

U.S. PATENT DOCUMENTS

| | | | |
|---|---|---|---|
| 2004/0025069 A1* | 2/2004 | Gary | G06F 1/3296 713/300 |
| 2011/0179298 A1* | 7/2011 | Odaohhara | G06F 1/3243 713/323 |
| 2014/0173298 A1* | 6/2014 | Bircher | G06F 1/3203 713/300 |
| 2019/0073011 A1* | 3/2019 | Paterson | G06F 1/28 |

* cited by examiner

*Primary Examiner* — Gary Collins
(74) *Attorney, Agent, or Firm* — Essential Patents Group, LLP

(57) ABSTRACT

Techniques and mechanisms for a power management circuit to monitor a power domain during one or more attempts to configure a low power state of the power domain. In an embodiment, the one or more attempts are performed during an instance of a local power state at a processor that is coupled to the power management circuit. The monitoring is to detect for a condition wherein the power domain has been in a power state, other than the low power state, for longer than a predetermined threshold length of time. Where the condition is detected, the power management circuit generates one or more signals which change the local power state of the processor, or interrupt an operating system that is executed with the processor. In another embodiment, the power management circuit provides analytic data based on the monitoring of the one or more attempts.

20 Claims, 9 Drawing Sheets

POWER MANAGEMENT CIRCUITRY FOR CONTROLLING A POWER STATE TRANSITION BASED ON A PREDETERMINED TIME LIMIT

BACKGROUND

1. Technical Field

This disclosure generally relates to power management for an integrated circuit and more particularly, but not exclusively, to the identification of a power state to be provided with a system-on-chip.

2. Background Art

In a system-on-chip (SOC), circuit components of the SOC are integrated on a single chip. SOC integrated circuits are becoming ever more popular in various applications including embedded applications such as with set-top-boxes, mobile phones, portable media devices, and so on. While the high integration of components in an SOC provides advantages such as chip area savings and better signal quality, power consumption and performance latency are becoming increasingly important constraints for devices that include such SOCs. Especially with portable SOC applications, efficient power management functionality is a valuable aspect of many SOC implementations.

With successive generations of integrated circuit technologies, the number, variety, and capabilities of SOCs continue to grow. As a result, there is expected to be an increasing premium placed on incremental improvements to how power efficiencies are provided by next-generation SOCs, and by SOCs which are already in use.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
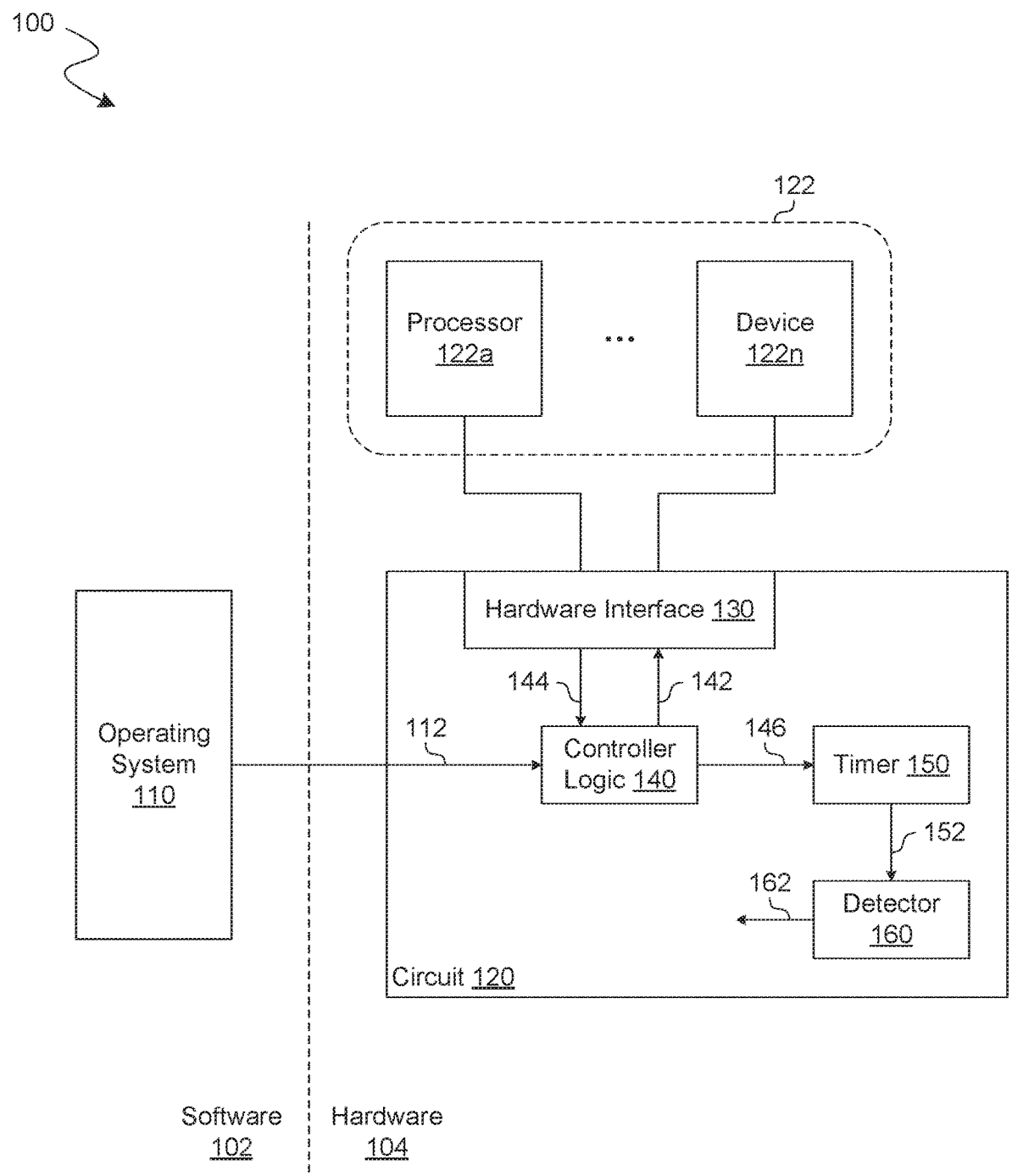
FIG. 1 illustrates a functional block diagram showing features of a system to control power delivery according to an embodiment.

Embodiments discussed herein variously provide techniques and mechanisms for efficiently determining a period of time during which a processor, and/or other circuitry of a power domain, is to be in a given power state. In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including circuitry to provide power management functionality as described herein.

Some embodiments variously provide power management controller circuitry—to be coupled to a processor and to one or more other devices of a power domain—which is operable to monitor the power domain during one or more attempts to configure a first power state of the power domain. The one or more attempts are performed, for example, during an instance of a local power state at a processor of the power domain. In one such embodiment, the monitoring is to detect for a condition wherein the power domain has been in a power state, other than the first power state, for longer than some predetermined threshold length of time. Where such a condition is detected—e.g., only after the condition is detected—the power management controller circuitry generates one or more signals which (for example) change the local power state of the processor and/or interrupt an operating system that is executed with the processor.

By contrast, some existing power management techniques variously require an OS to set a time limit and initiate a test which deterministically transitions a power domain into, and then out of, a low power state according to the time limit. Furthermore, the OS is relied upon to evaluate results of the test to determine whether and/or how another low power state of the power domain might be implemented for actual power reduction. As compared to these existing techniques, various embodiments allow for power state transitions which are more time efficient and/or energy efficient.

Certain features of various embodiments are described herein with reference to one or more attempts to provide a first power state of a power domain, where the one or more attempts are performed during an instance of a second power state at a processor. In this particular context, "power domain", as used herein, refers to a set of circuit resources which include at least one device other than a processor. Accordingly, the first power state includes at least some configuration and/or mode of operation of the at least one device. By contrast, the second power state of the processor includes only a configuration and/or mode of operation of the processor—e.g., independent of whether or how other circuitry of the power domain might be configured and/or operated. For this reason, the term "local power state" is used herein to refer to a power state which is specific to a processor.

Unless otherwise indicated, "low power state" (also abbreviated "LPS") refers herein to a power state of a power domain—e.g., as distinguished from a local power state of a processor. The low power state is, for example, any of various power states for which a power state transition is performed non-deterministically (that is, wherein a successful transition to said system power state is not predetermined). In some embodiments, the low power state is any of a variety of active idle states that provide power savings of a sleep state (or other relatively low power state), but which enable a quick wake up time to higher power "active" state—for device use—such as one which is compatible with an Advanced Configuration and Power Interface (ACPI)

specification. In one such embodiment, the low power state is an S0ix state such as one provided by any of various integrated circuit chips by Intel® Corporation of Santa Clara, Calif., USA. By contrast, a local power state at a processor is any of various "C" states which are compatible with an ACPI specification, in some embodiments.

FIG. 1 shows features of a system 100 to manage a delivery of power to circuitry according to an embodiment. System 100 is one example of an embodiment wherein power management circuitry, which supports coupling to a processor, provides functionality to monitor whether a power domain (which includes the processor and other circuitry) has remained outside of a particular power state for more than a threshold period of time. In some embodiments, the state of an operating system (OS), which is executed with the processor, is saved in memory before a transition to the power state. In one such embodiment, a failure of the power domain to enter (e.g., reenter) the power state within the threshold period of time results in the power management circuitry configuring a processor to transition from one local power state to another local power state which supports increased power consumption.

As shown in FIG. 1, system 100 comprises hardware 104 including circuitry that supports operation as a component of a desktop computer, laptop computer, handheld device (e.g., a smart phone, palmtop device, tablet, etc.), gaming console, wireless communication device, or other such computing-capable device. To facilitate such operation, hardware 104 comprises multiple devices 122 which, at different times, exhibit various respective power consumption requirements, power reduction margins and/or other such power utilization characteristics. In the example embodiment shown, such devices 122 comprise a processor 122a (including one or more processor cores) and one or more other devices—represented as the illustrative device 122n shown—which, for example, include some or all of a memory controller, a memory, interconnect circuitry, a hub module, any of various other chipset components, or the like. However, some embodiments are not limited with respect to the particular number or configuration of devices 122 for which power management is provided with system 100. For example, in other embodiments, power management is provided for more, fewer and/or differently configured ones of devices 122.

In an embodiment, software 102 is provided by an execution of instructions with processor 122a and/or other such processor logic of hardware 104—e.g., wherein software 102 comprises the illustrative operating system 110 shown. In some embodiments, OS 110 is a Windows-based operating system, a Unix or Linux based operating system, a MacOS, or any other operating system suitable to support power management functionality as described herein. In one such embodiment, OS 110 is of a type (such as iOS, Android, Windows Mobile, etc.) that is designed for operation on a handheld device. Additionally or alternatively, OS 110 supports power management functionality which is compatible with any of various Advanced Configuration and Power Interface (ACPI) specifications, such as ACPI Specification, Revision 5.1, released in July 2014 by the Unified Extensible Firmware Interface (UEFI) Forum.

During operation of system 100, a power domain comprising devices 122 operates at different times in any of two or more power states, where power management circuitry of system 100 (e.g., including the illustrative circuit 120 shown) supports, initiates, or otherwise manages transitions between such power states. According to one exemplary embodiment, circuit 120 comprises circuit logic (represented by the illustrative controller logic 140 shown) to identify a given power state which is to be configured for system 100. Such identifying is based in part on an operational state of system 100—e.g., including a state of current and/or expected future operation of one or more of devices 122.

In the example embodiment shown, a hardware interface 130 of circuit 120 facilitates coupling of circuit 120 to devices 122, wherein controller logic 140 is coupled to communicate with devices 122 via hardware interface 130. At a given time during operation of system 100, controller logic 140 detects an opportunity to transition the power domain to an LPS, where such detecting is based on communications with devices 122. In an illustrative scenario according to one such embodiment, controller logic 140 receives from OS 110 a signal 112 which specifies or otherwise indicates that OS 110 is able to accommodate (or is expected to be able to accommodate) an LPS of a power domain which includes devices 122. In implementation, signal 112 is communicated (for example) from processor 122a as one of the signals 144 received by circuit 120 via hardware interface 130.

In response to signal 112, controller logic 140 identifies a next power state (e.g., an LPS) for the power domain to enter. To facilitate a transition of the power domain to the next power state, controller logic 140 sends one or more signals (e.g., including the illustrative control signals 142 shown) to variously configure one of more of devices 122. For example, control signals 142 cause one or more of devices 122 to perform clock gating, power gating, selectively enabling/disabling voltage supply circuitry and/or any of various other power management operations—e.g., including one or more operations that (for example) are adapted from conventional power management mechanisms and techniques. The particular number, type and/or order of power mode transition actions performed in response to such control signals are not limiting on some embodiments.

Based on control signals 142, one or more attempts to perform the transition are performed (for example) during an instance of a local power state at processor 122a—e.g., wherein an LPS of the power domain requires, comprises or is otherwise based on the processor 122a being in said local power state. In one such embodiment, the power domain performs multiple attempts to transition to an LPS—e.g., wherein the power domain variously completes multiple transitions, each to the LPS or from the LPS, during the one instance of the local power state at processor 122a. During the one or more attempts to transition the power domain to the LPS, signals 144 communicate to controller logic 140 various operational conditions of the power domain—e.g., wherein signals 144 indicate a current power state of the power domain and/or a current ability (or inability) of the power domain to transition to some next power state.

To facilitate monitoring of the one or more attempts, controller logic 140 communicates a signal 146 which, at different times, variously starts, stops and/or resets a timer 150 of circuit 120. For example, timer 150 is started—in response to the initiating of a first attempt to transition the power domain to an LPS—to begin the tolling of a predetermined time limit for a completion (if any) of the first attempt. In one such embodiment, timer 150 stops the tolling of such a predetermined time limit in response to controller logic 140 determining that the first attempt (or some later attempt to transition to the LPS) has completed. Alternatively or in addition, in response to the power domain transitioning to a different power state (e.g., after the power domain had previously entered the LPS) while processor 122a remains in the same local power state, timer 150 starts the tolling of another predetermined time limit for the completion of a later attempt (if any) to again transition the power domain to the LPS.

Circuit 120 provides functionality to change an operational state of devices 122 based on an expiration of a time limit that is indicated by timer 150. For example, timer 150 is coupled to provide to a detector 160 of circuit 120 a signal 152 which indicates an expiration of a time limit before timer 150 could be stopped by signal 146. Based on signal 152 indicating such an expiration, detector 160 generates a signal 162 which provides a basis for modifying operation of one or more of devices 122. In one example embodiment, signal 152 is (or provides a basis for communicating) an interrupt message—e.g., communicated as one of control signals 142—to facilitate a transition of processor 122a to another local power state which enables a relatively high power consumption.

Figure 2:
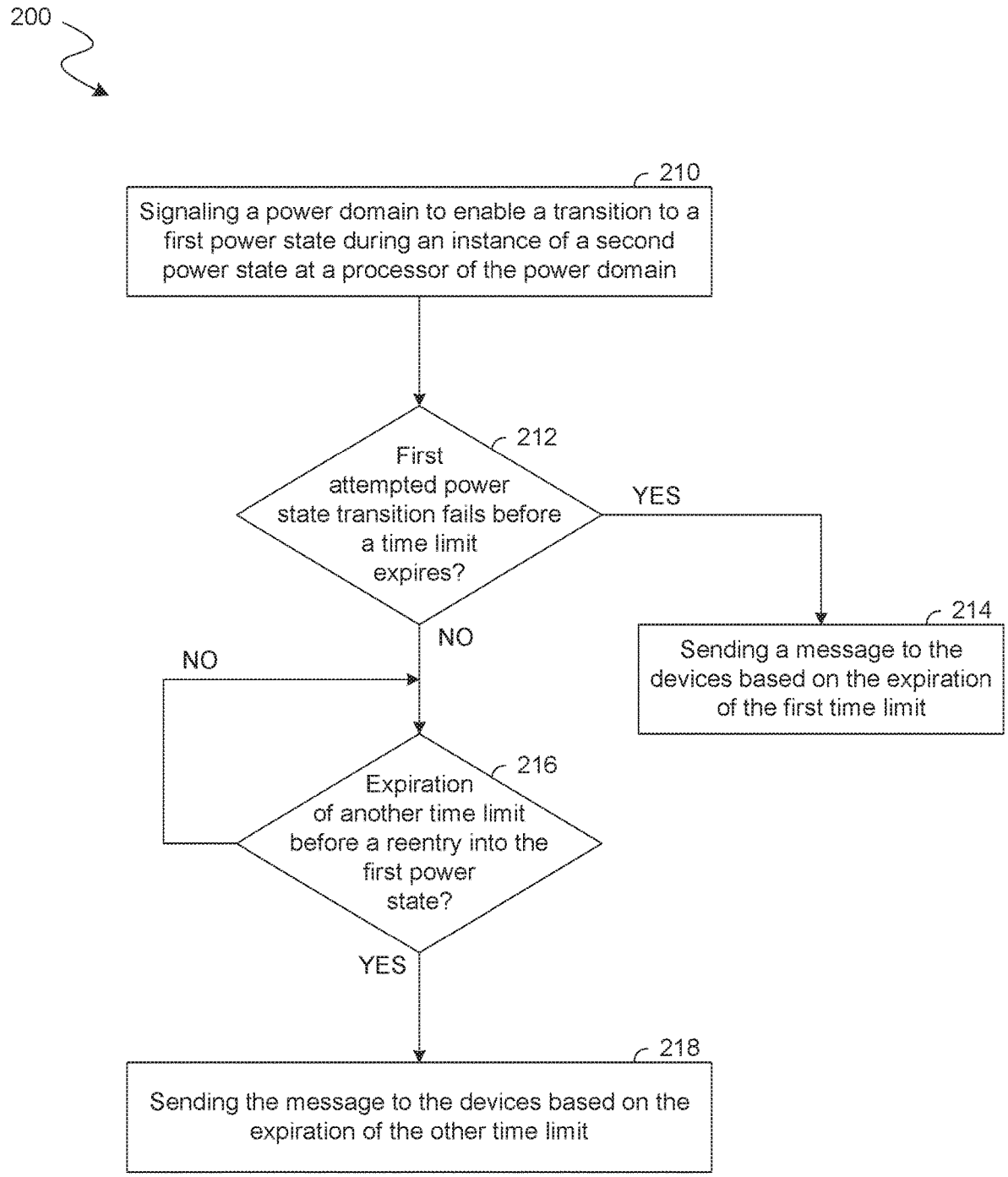
FIG. 2 illustrates a flow diagram showing features of a method for operating a power management controller circuit according to an embodiment.

FIG. 2 shows features of a method 200 to operate a power management circuit according to an embodiment. Method 200 is one example of an embodiment wherein power management circuitry monitors one or more attempts by a power domain to enter—e.g., including to reenter—a low power state. Such monitoring is performed to detect for an instance of an event wherein the power domain has been outside of the lower power state for more than some predetermined threshold period of time. In response to detecting such an instance, the power management circuitry generates one or more control signals which (for example) are to configure a higher power state at a processor which supports the execution of an operating system. In various embodiments, method 200 is performed at circuit 120.

As shown in FIG. 2, method 200 includes (at 210) signaling devices of a power domain to enable a transition of the power domain to a first power state—e.g., an LPS. Such signaling is to enable the transition to occur during an instance of a second power state at a processor of the devices. For example, the second power state is a local power state of the processor—e.g., wherein the first power state of the power domain requires, comprises, or is otherwise based on the processor being in the second power state. In one illustrative embodiment, the signaling at 210 comprises controller logic 140 sending control signals 142 to one or more of devices 122.

Method 200 further comprises performing an evaluation (at 212) to detect whether a first attempt by the power domain to enter the first power state—the first attempt based on the signaling at 210—fails to complete before an expiration of a time limit. Where it is determined at 212 that the first attempt did fail to complete before the time limit expired, method 200 (at 214) sends a message to the devices based on the expiration of the time limit. In an embodiment, the message is sent at 214 to change an operation of one or more devices of the power domain—e.g., wherein the processor ends the instance of the second power state based on the message. Additionally or alternatively, the message includes or otherwise results in a software interrupt which is communicated to an operating system that is executed with the processor.

However, where it is instead determined at 212 that the first attempt completed before the time limit expired, method 200 performs another evaluation (at 216) to detect for any instance of another time limit occurring before the power domain reenters the first power state. Any such reentry occurs (for example) after an exit of the power domain from the first power state, but during the same instance of the second power state at the processor. In some embodiments, the evaluating at 216 includes, for example, monitoring for any instance of the power domain being in a power state other than the first power state when another time limit expires.

In some embodiments, the evaluating at 212 comprises, or is otherwise based on, method 400 starting a timer in response to one or both of an initiation of a first attempt to enter the first power state, and a stopping of the timer in response to a completion of the first attempt. Additionally or alternatively, the evaluating at 216 comprises, or is otherwise based on, method 400 performing one or more of resetting a timer based on the completion of the first attempt, restarting the timer in response to an initiation of a second attempt by the power domain to enter the first power state, and stopping the timer in response to a completion of the second attempt.

Where it is determined at 216 that no other time limit has yet expired while the power domain is in a power state other than the first power state, method 200 repeats a performance of the evaluating at 216. However, where it is instead determined at 216 that some second time limit has expired while the power domain is in another power state, method 200 sends the message to the devices (at 218) based on the expiration of the second time limit. The message sent at 218 is similar in one or more respects to the one which, under different circumstances, method 200 would otherwise sent at 214. For example, in some embodiment, the message sent at 218 facilitates an end to the instance of the second power state at the processor, and/or facilitates the communication of a software interrupt to an operating system that is executed with the processor.

In some embodiments, a duration of the first time limit and/or a duration of the second time limit is determined based on a threshold period of time which (for example) is provided by any of various agents or authorities including, but not limited to, an operating system, a power management application, a chip manufacturer or the like. For example, the duration of the first time limit is equal to the duration of the second time limit, in some embodiments. Alternatively or in addition, the threshold period of time is a default period of time that is automatically set at a startup of a platform which includes the power management circuit. Alternatively or in addition, method 400 includes additional operations (not shown) which evaluate or otherwise detect one or more metrics of performance by devices of the power domain, and dynamically update the threshold period of time based on such one or more metrics.

Some embodiments variously perform operations of method 200 multiple times each for a different respective power state of the power domain. For example, in one such embodiment, method 200 further comprises signaling the devices of the power domain to enable a second transition of the power domain (e.g., the second transition during another instance of some fourth power state at the processor) to a third power state other than the first power state. The fourth power state is the second power state, for example, although some embodiments are not limited in this regard. Where it is determined that a second attempt by the power domain to enter the third power state fails to complete before an expiration of a third time limit, method 400 sends a second message to the devices based on the expiration of the third time limit. Otherwise, method 400 subsequently detects that some later expiration of a fourth time limit occurs both after an exit from the third power state, and before the power domain reenters the third power state. Based on such an expiration of the fourth time limit, method 400 sends the second message to the devices. In one such embodiment, the processor is to end the second instance of the fourth power state based on the second message.

Figure 3:
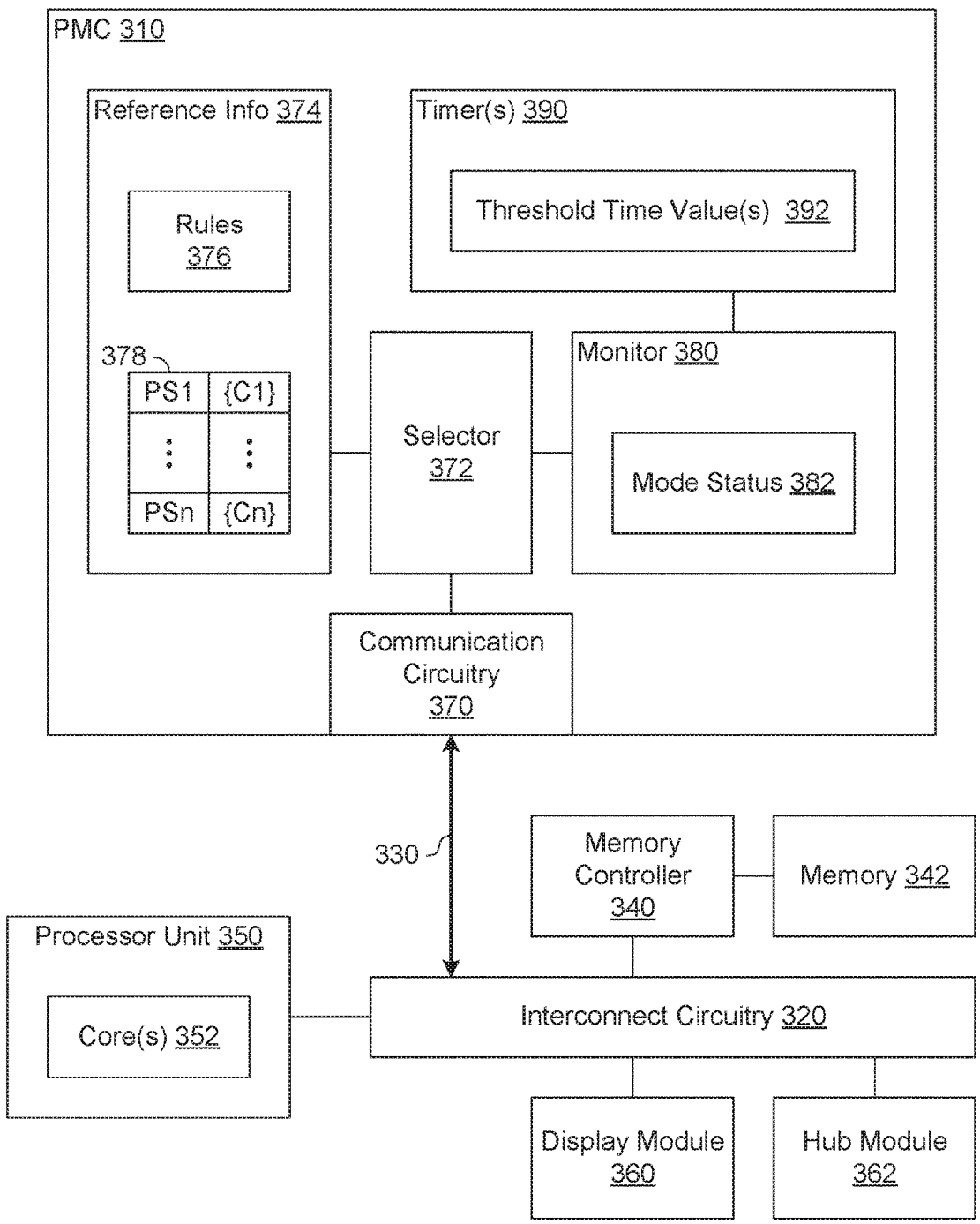
FIG. 3 illustrates a functional block diagram showing features of a system to monitor a configuration of a power state according to an embodiment.

FIG. 3 shows features of a system-on-chip (SOC) 300 to configure a power state according to another embodiment. SOC 300 is one example of an embodiment that facilitates monitoring of a power domain during one or more attempts to transition the power domain to an LPS. In one such embodiment, where the monitoring indicates that the power domain has been outside of the LPS for at least some threshold period of time, a processor of the power domain is transitioned from one local power state to another local power state for relatively high power use. SOC 300 includes features of system 100, in some embodiments—e.g., where SOC 300 is operable to perform some or all of method 200.

As shown in FIG. 3, SOC 300 comprises multiple functional blocks (devices) of a power domain, where said devices exhibit various respective power consumption requirements, power reduction margins and/or other such power utilization characteristics at different times. For example, such devices comprise a processor unit 350 (including one or more processor cores 352), and one or more of a memory controller 340, a memory 342, interconnect circuitry 320, a display module 360, and a hub module 362. However, some embodiments are not limited with respect to the particular number or configuration of devices for which power management is provided at SOC 300. For example, in other embodiments, power management is provided for more, fewer and/or differently configured devices of a power domain.

Interconnect circuitry 320 couples some or all such devices to circuit logic of SOC 300 (such as the illustrative power management controller PMC 310 shown) which is to determine a power state of the power domain. Interconnect circuitry 320 includes any of a variety of one or more busses, crossbars, fabrics and/or other connection mechanisms to variously couple one or more devices of SOC 300 to PMC 310. For example, interconnect circuitry 320 facilitates communication of control signals from PMC 310 each to a respective device, where said control signals variously configure respective operational parameters of a given power mode. Alternatively or in addition, interconnect circuitry 320 facilitates communication of one or more sensor signals each from a respective device to PMC 310. Such one or more sensor signals facilitate the identification of a current power state, a next power state, and/or a pendency of an attempt to transition between power states of SOC 300, for example. In some embodiments, interconnect circuitry 320 further facilitates communication between various devices via one or more paths which are independent of PMC 310.

In an example embodiment, processor unit 350 is operable to execute a Basic Input/Output System (BIOS), an operating system (OS) and/or any of various other software processes—e.g., by accessing instructions stored in memory 342 or in a separate storage device. For example, the one or more cores 352 provide functionality to execute an OS which is to variously send to memory controller 340 requests to read data from, and/or write data to, access memory 342.

During operation of SOC 300, memory controller 340 provides processor unit 350 with access to memory 342, such as a dynamic random access memory (DRAM). Operation of memory 342 and memory controller 340 conform, for example, to some or all requirements of a dual data rate (DDR) specification such as the DDR Four (DDR4) Synchronous DRAM (SDRAM) specification JESD79-4B, published June 2017 by the JEDEC Solid State Technology Association of Arlington, Va., a high bandwidth memory (HBM) specification such as the HBM DRAM Standard JESD235, October 2013, or other such specification.

Display module 360 is operable to perform image data processing and hub module 362 to serve as a hub for of one or more other components (not shown) of SOC 300. Hub module 362 comprises a platform hub, an input/output (I/O) hub or other such hub circuitry, for example. In one such embodiment, display module 360 and/or hub module 362 access memory 342 at various times via memory controller 340—e.g., where such access is supported by a given power state of SOC 300.

To facilitate operation of SOC, PMC 310 supports, initiates, or otherwise implements transitions of the above-described power domain between various power states at different times. In the illustrated embodiment, PMC 310 is coupled to participate in communications with the power domain and, based on such communications, to initiate and/or otherwise manage one or more attempts to provide an LPS of the power domain. The one or more attempts are monitored at PMC 310 to determine, for example, whether an amount of time during which the power domain is in some other power state (e.g., including an amount of time spent attempting to enter the LPS) exceeds a predetermined threshold time limit.

In the illustrated embodiment, communication circuitry 370 of PMC 310 is coupled to participate in communications with one or more devices of the power domain via interconnect 330, where a selector 372 of PMC 310, based on such communications, identifies a next power state to be configured, and instructs communication circuitry 370 to initiate and/or otherwise manage one or more attempts to provide an LPS. In some embodiments, the one or more attempts take place during an instance of a local power state of processor unit 350 (such as a C10 state, for example)—e.g., wherein the LPS of the domain includes, requires or is otherwise based on said local power state of processor unit 350. In one illustrative embodiment, control signals provided by communication circuitry 370 to the power domain cause one or more devices of the power domain to perform clock gating, power gating, selectively enabling/disabling voltage supply circuitry and/or any of various other power management operations—e.g., including one or more operations that (for example) are adapted from conventional power management mechanisms and techniques. The particular number, type and/or order of power mode transition actions performed in response to such control signals are not limiting on some embodiments.

In one exemplary embodiment, selector 372 identifies a next power state which is to be configured for the power domain. Such identifying is based in part on an operational state of SOC 300—e.g., including a state of current and/or expected future operation of one or more devices of SOC 300. By way of illustration and not limitation, PMC 310 is programmed or otherwise provided with configuration state which enables an identification of a current power state of a power domain, a next power state to be provided at the power domain, and/or whether (or not) a transition between such power states has completed, or is ready to be completed. For example, such configuration state includes, is based on, or otherwise corresponds to reference information 374 which is coupled to (or alternatively, provided by) selector 372. In the example embodiment shown, reference information 374 comprises a table 378 (or other suitable data structure) including entries which each specify or otherwise indicate, for a respective power state of a given power domain, a corresponding one or more operational conditions of a power domain's devices. For example, table 378 identifies a set of conditions {C1} as being met by, required for and/or otherwise corresponding to a power state PS1 of a power domain which includes processor unit 350 and some or all of memory controller 340, memory 342, interconnect circuitry 320, display module 360, and hub module 362. Furthermore, table 378 similarly indicates a set of conditions {Cn} as corresponding to a power state PSn of the power domain. In one such embodiment, reference information 374 further specifies or otherwise indicates various rules 376 according to which a particular power state transition is to take place. For example, rules 376 identify one or more criteria for determining whether and/or how the power domain is to transition from one power state to another power state (e.g., from PSn to PS1). Some or all of reference information 374 is provided, for example, based on operations which are adapted from conventional techniques for configuring power management functionality.

Responsive to selector 372 determining a next power state (e.g., an LPS) of the power domain, communication circuitry 370 communicates with devices of the power domain to initiate one or more attempts to transition to the next power state. In an embodiment, the one or more attempts are non-deterministic at least insofar as the number of attempts to be performed, and/or the success or failure of any one event, is subject to operational state of the power domain and/or other circuitry of SOC 300. To accommodate the non-deterministic nature of the one or more attempts, a monitor 380 of SOC 300 is coupled receive from selector 372 information (represented as the illustrative mode status 382 shown) which specifies or otherwise indicates some or all of a current power state of the power domain, a next intended power state of the power domain, whether an attempted power state transition is currently underway, whether an attempted power state transition has failed, and/or the like.

Monitor 380 provides functionality to evaluate an attempted power state transition of the power domain, where the evaluation is based both on mode status 382, and on a predetermined threshold maximum period of time that the power domain is to be in a power state other than an intended next power state (e.g., other than an LPS). For example, monitor 380 is coupled to (or alternatively, includes) one or more timers 390 which are each operable to count or otherwise track the running of a respective limited period of time. In an embodiment, a threshold time value provides a basis for the duration of a corresponding time limit—e.g., wherein the one or more timers 390 track respective time limits each based on the respective one of the illustrative one or more threshold time values 392 shown.

In one such embodiment, a given timer is started by monitor 380 in response to an indication from selector 372 that an attempted transition to an LPS has been started. Alternatively or in addition, the timer is stopped (and, for example, reset) by monitor 380 in response to an indication from selector 372 that the power domain has completed a transition to the LPS. In some embodiments, the timer is started (e.g., restarted) by monitor 380 in response to an indication from selector 372 that the power domain has completed a transition to a power state other than the LPS. Based on such operation of the one or more timers 390, monitor 380 detects whether a duration of a power state, and/or a duration of an attempted power state transition, exceeds a predetermined time limit.

In an embodiment, exceeding such a time limit results in PMC 310 participating in a communication to change operation of the power domain—e.g., wherein processor unit 350 transitions to a different local power state which enables increased power consumption. By way of illustration and not limitation, where an expiration of a time limit occurs before completion of an initial attempt to transition the power domain to an LPS, a message is generated—based on the failure of the initial attempt to complete before the expiration—to facilitate a local power state transition at processor unit 350. The message is generated, for example, with one or more of monitor 380, selector 372, or communication circuitry 370. Otherwise (where the initial transition to the LPS completes before the time limit expires), PMC 310 instead generates the message at a later time—e.g., based on an expiration of another time limit while the power domain is subsequently in a power state other than the LPS.

In some embodiments, circuitry of PMC 310—e.g., including circuitry of selector 372 or monitor 380—further generates analytic information based on the monitored one or more attempts by the power domain to enter the LPS. In one such embodiment, the analytic information specifies or otherwise indicates a duration of an instance of power domain being in the LPS, a duration of an instance of power domain being in a power state other than the LPS, and/or the like. Some or all such analytic information is made available by PMC 310 to the power domain and/or other circuitry of SOC 300. For example, an operating system (not shown) that is executed with processor unit 350 receives such analytic information from communication circuitry 370 to facilitate improved software execution in support of power management with PMC 310.

In various embodiments, such analytic information is additionally or alternatively made available to dynamically update some or all of the one or more threshold time values 392—e.g., to change the duration of a time limit to be used in a later evaluation of power state transitions.

Figure 4:
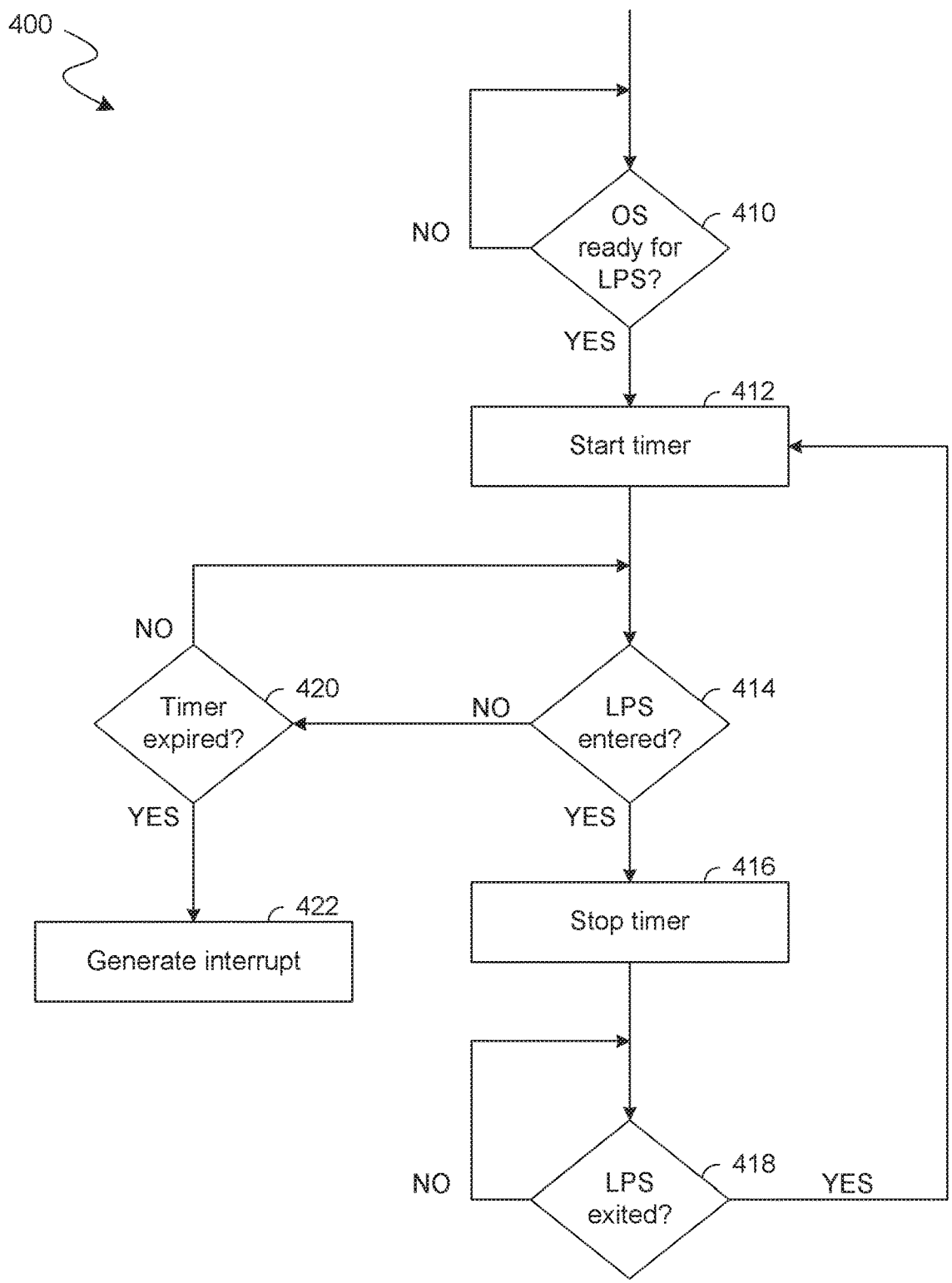
FIG. 4 illustrates a flow diagram showing features of a method for managing power delivery to circuit devices according to an embodiment.

FIG. 4 shows features of a method 400 to manage one or more power state transitions according to an embodiment. Method 400 is one example of an embodiment wherein power management circuitry, which is coupled to a processor and other devices of a power domain, operates a timer to monitor for an instance of an event wherein the power domain fails to transition to a low power state—or otherwise remains outside of the power state—after some threshold period of time. In various embodiments, method 400 includes features of method 200 and/or is performed with circuit 120 or PMC 310 (for example).

As shown in FIG. 4, method 400 comprises performing an evaluation (at 410) to detect whether an OS, which is executed with a processor of the power domain, is able (or is expected to be able) to accommodate a low power state (LPS) of the power domain. Where it is detected at 410 that the OS will be unable to accommodate the low power state, method 400 repeats the evaluation at 410 until an opportunity to enter the LPS is detected. However, where it is instead detected at 410 that the OS will be able to accommodate the LPS, method 400 starts a timer (at 412) to facilitate a monitoring of whether the power domain transitions to the LPS within a predetermined time limit. For example, after the timer is started at 412, method 400 further performs an evaluation (at 414) to determine whether the power domain has completed an entry into the LPS.

Where it is determined at 414 that the power domain has entered the LPS, method 400 stops the timer (at 416). After the timer is stopped at 416 method 400 further performs an evaluation (at 418) to determine whether the power domain has since exited the instance of the LPS which was detected with the most recent evaluation at 414. Where it is determined at 418 that the power domain has exited the LPS, method 400 again starts the timer at 412 to track the duration of a next period of time during which the power domain is in a power state other than the LPS. However, where it is instead determined at 418 that the power domain has yet to exit the most recent instance of the LPS, method 400 again performs the evaluation at 418 until an exiting of the most recent instance occurs.

By contrast, where it is instead determined at 414 that the power domain has yet to complete an entry into the LPS, method 400 performs another evaluation (at 420) to determine whether the timer has expired while—as determined by the most recent evaluation at 414—the power domain is outside of the LPS. Where it is determined at 420 that the timer has not yet expired, method 400 repeats another evaluation at 414. However, where it is instead determined at 420 that the timer has expired, method 400 generates an interrupt message (at 422) which—for example—is to transition the processor into a relatively high processor power state (e.g., a higher Cx power state).

Figure 5:
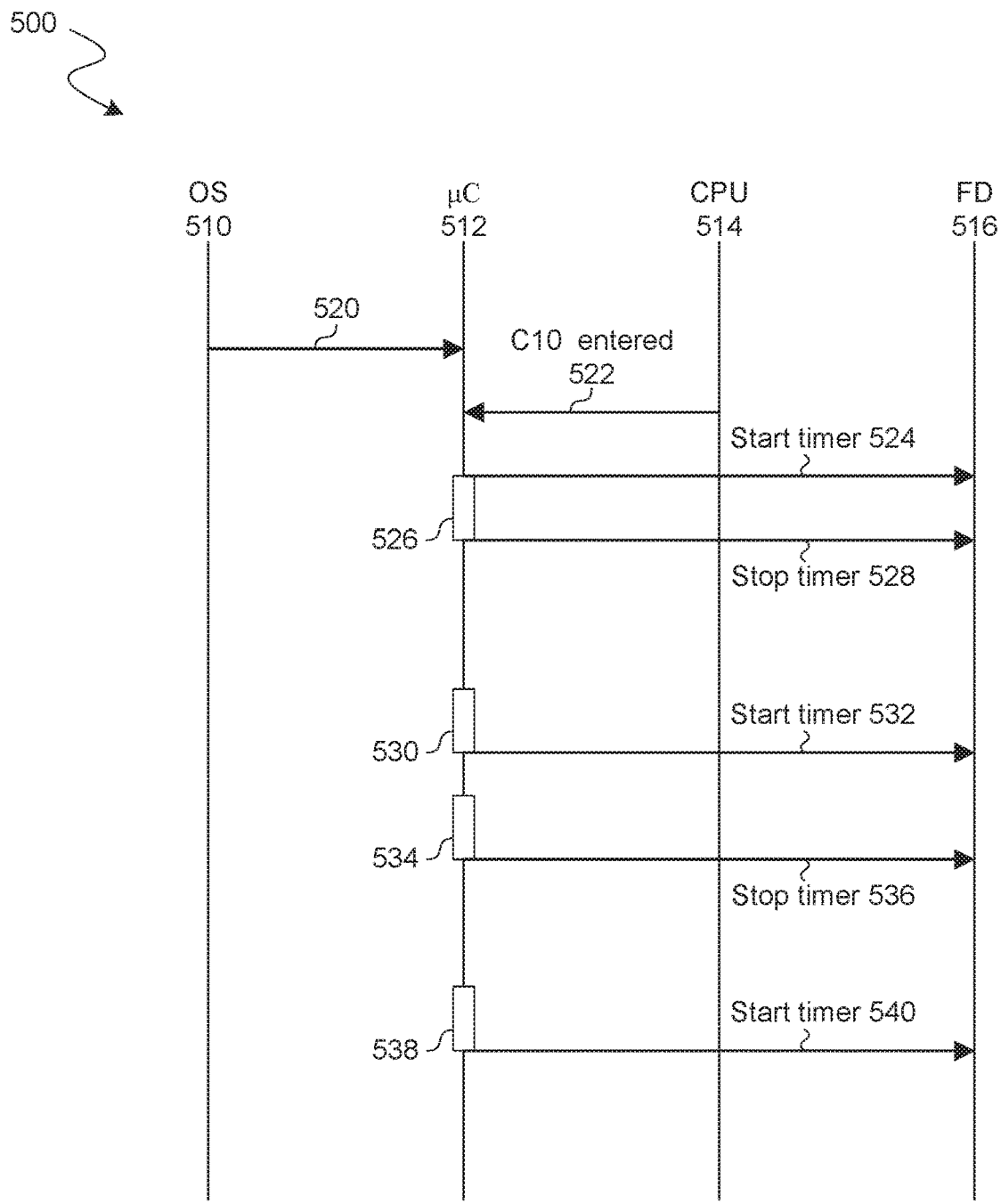
FIGS. 5 through 7 are swim lane diagrams each showing features of respective communications performed with a power management controller according to a corresponding embodiment.
Figure 6:
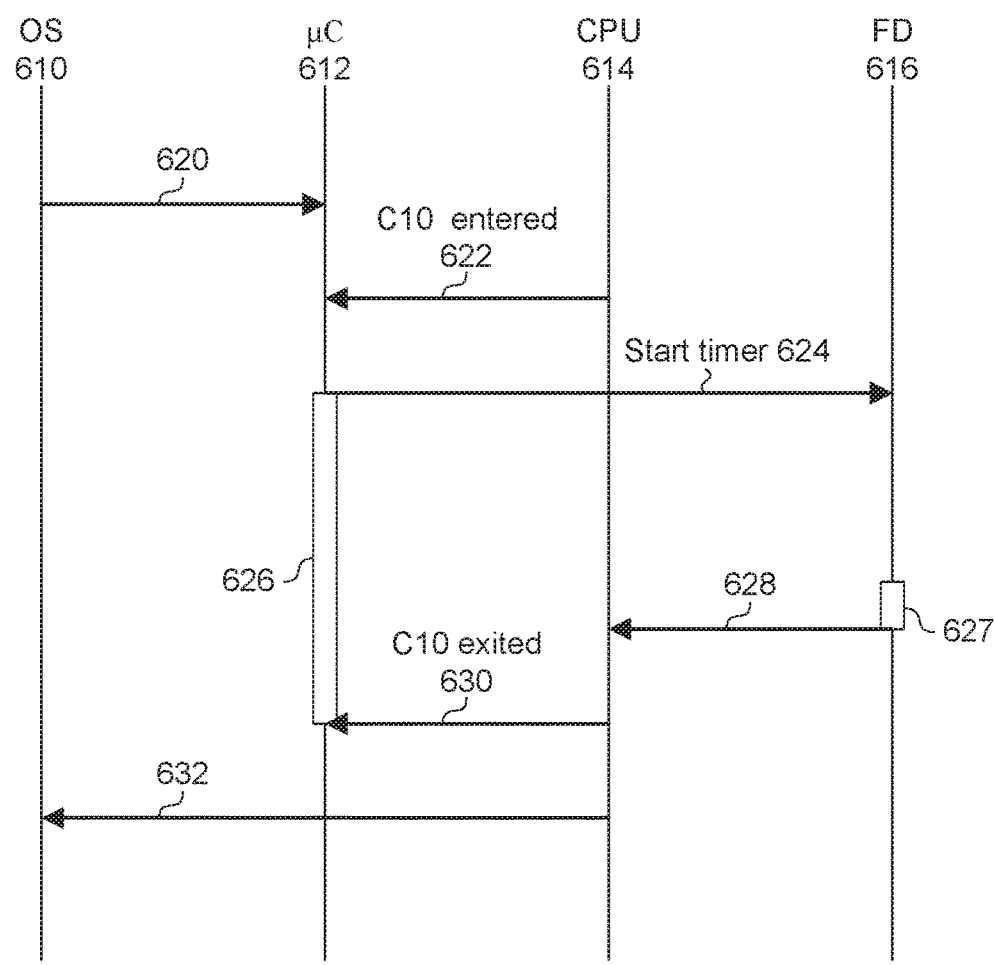
Figure 7:
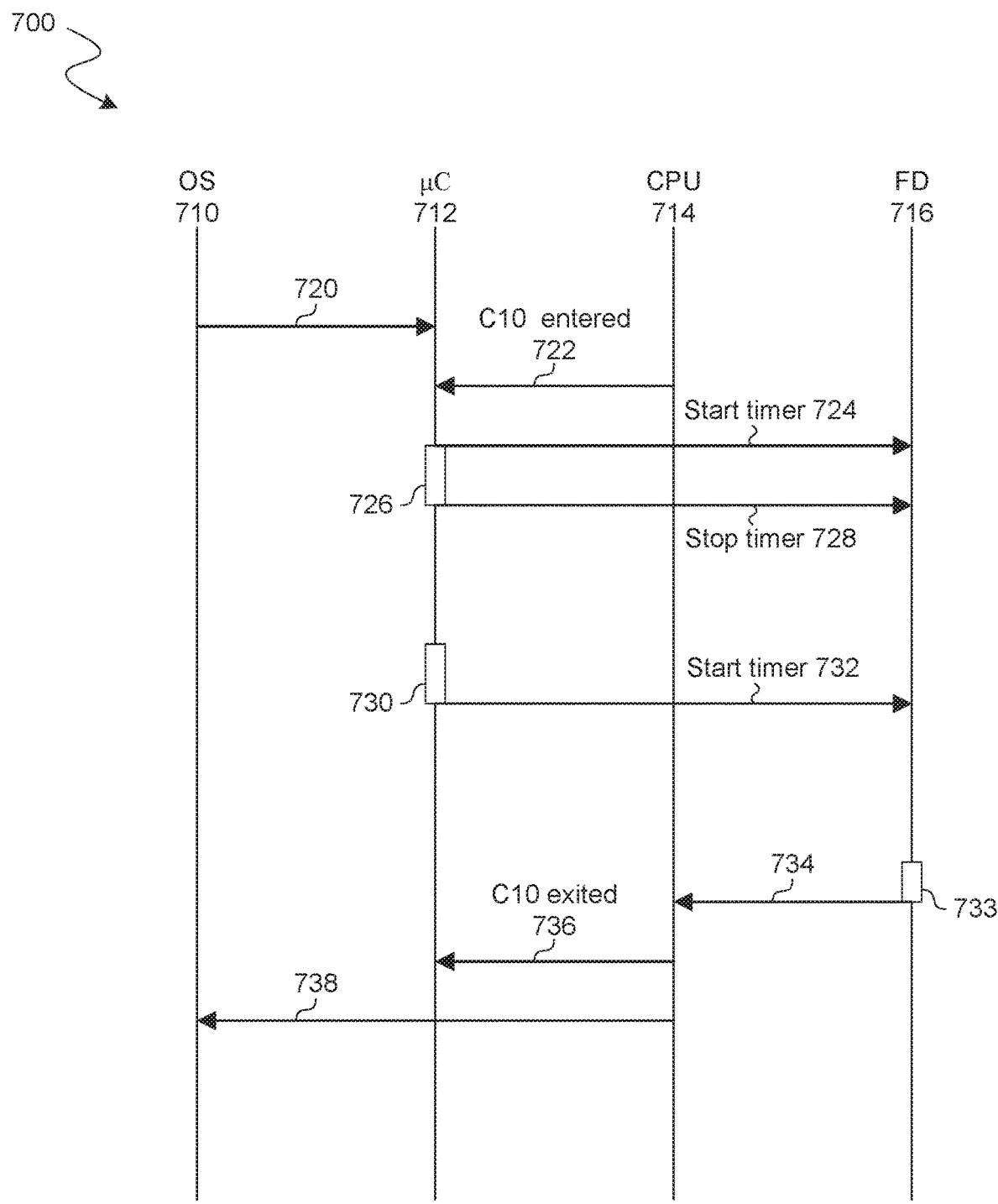

FIGS. 5, 6, and 7 illustrate various communications 500, 600, 700 (respectively) which are communicated each with a power management circuit according to a corresponding embodiment. Communications 500, 600, 700 represent different scenarios wherein power management circuitry monitors, and operates based on, one or more non-deterministic attempts to enter a low power state of a power domain. Communications such as those illustrated in one or more of FIGS. 5, 6, and 7 are performed, for example, with system 100 or SOC 300—e.g., wherein one of methods 200, 400 includes or otherwise results in said communications.

As shown in FIG. 5, communications 500 comprise signals which are variously communicated between respective ones of an operating system (OS) 510, microcontroller circuitry μC 512, a central processing unit (CPU) 514, and a failure detection circuit (FD) 516. In an embodiment, OS 510, μC 512, CPU 514, and FD 516 correspond functionally to OS 110, controller logic 140, processor 122*a*, and detector 160 (respectively).

For example, OS 510 sends to μC 512 a signal 520 comprising an indication that OS 510 is, or will be, able to accommodate an LPS of a power domain which includes CPU 514 and one or more other devices (not shown). Subsequently, μC 512 receives another signal 522 which specifies or otherwise indicates that CPU 514 has entered a local power state (in this example, a C10 power state) which is a condition of, or otherwise facilitates, the LPS of the power domain. Signal 522 is communicated, for example, based on the state of OS 510 (which is executed with CPU 514) being stored to memory in preparation for the local power state of CPU 514.

Based on signals 520, 522, μC 512 generates a control signal 524 to start a timer circuit of FD 516, where such starting facilitates monitoring to determine whether a first time limit expires before the completion (if any) of an initial attempt to enter the LPS. In an embodiment, the initial attempt includes or is otherwise based on operations 526 performed by μC 512—e.g., the operations 526 including participation in communications with one or more devices of the power domain. In the illustrative scenario shown, the initial attempt to enter the LPS succeeds before an expiration of the first time limit. Accordingly, μC 512 sends to FD 516 another control signal 528 to stop the timer (and, in some embodiments, to reset the timer to some baseline value).

Subsequently, some condition of the power domain requires an exit of the power domain from the LPS to another power state—e.g., wherein operations 530 by μC 512 (performed based on the condition) complete a transition the power domain to the other power state. In response to the power domain exiting the LPS based on operations 530, μC 512 generates another control signal 532 to start the timer again to facilitate additional monitoring to detect whether a second time limit expires before the completion (if any) of a second attempt by the power domain to reenter the LPS. The second attempt includes or is otherwise based on operations 534, performed by μC 512, to modify one or more operational characteristics of the power domain.

In the illustrative scenario shown, the second attempt to (re)enter the LPS succeeds before an expiration of the second time limit. Accordingly, μC 512 sends to FD 516 another control signal 536 to again stop (and, in some embodiments, reset) the timer. Subsequently, another condition of the power domain requires operations 538 by μC 512 to facilitate another exit of the power domain from the LPS. In response to the power domain exiting the LPS based on operations 538, μC 512 generates yet another control signal 540 to again start the timer. In this way, multiple instances of the LPS are successively implemented during an instance of a C10 power state of CPU 514—e.g., until such time as the power domain is in power state, other than the LPS, for more than a predetermined threshold maximum period of time.

Communications 600 comprise signals which are variously communicated between respective ones of an OS 610, microcontroller circuitry μC 612, a CPU 614, and a failure detection circuit (FD) 616—e.g., OS 510, μC 512, CPU 514, and FD 516 (respectively). As shown in FIG. 6, communications 600 include signals 620, 622, and 624 which, for example, correspond functionally to signals 520, 522, and 524 (respectively). Signal 624 starts a timer circuit of FD 616 to facilitate a determining of whether a first time limit expires before the completion (if any) of an initial attempt to enter an LPS of a power domain. In an embodiment, this initial attempt is based on operations 626 performed by μC 612—e.g., where operations 626 correspond functionally to operations 526.

In the illustrative scenario shown, the initial attempt to enter the LPS fails before a detection 627 by FD 616 that the first time limit has expired. In response to the detection 627, FD 616 communicates a signal 628 to bring CPU 614 out of a local power state (in this example, a C10 state). Subsequently, a signal 630 indicates to μC 612 that CPU 614 has completed a transition from the C10 state to another power state that enables higher power consumption. Additionally or alternatively, CPU 614 provides a software interrupt 632 to at least temporarily stop one or more processes of OS 610.

Communications 700 comprise signals which are variously communicated between respective ones of an OS 710, microcontroller circuitry μC 712, a CPU 714, and a failure detection circuit (FD) 716—e.g., OS 510, μC 512, CPU 514, and FD 516 (respectively). As shown in FIG. 7, communications 700 include signals 720, 722, 724, 728, and 732 which (for example) correspond functionally to signals 520, 522, 524, 528, and 532 (respectively). FIG. 7 further shows operations 726 and 730 which, for example, correspond functionally to operations 526 and 530 (respectively).

Signal 732 starts a timer circuit of FD 716 to facilitate a determination of whether a time limit expires before the completion (if any) of an attempt to reenter an LPS of a power domain. In an embodiment, this attempt is based on operations 730 performed by μC 712 to at least temporarily exit the power domain from the LPS. In the illustrative scenario shown, an attempt (if any) to have the power domain reenter the LPS fails before a detection 733 by FD 716 that the time limit has expired. In response to the detection 733, FD 716 communicates a signal 734 to bring CPU 714 out of a local power state (in this example, a C10 state). Subsequently, a signal 736 indicates to μC 712 that CPU 714 has completed a transition from the C10 state to another power state that enables higher power consumption. Additionally or alternatively, CPU 714 provides a software interrupt 738 to at least temporarily stop one or more processes of OS 710.

Figure 8:
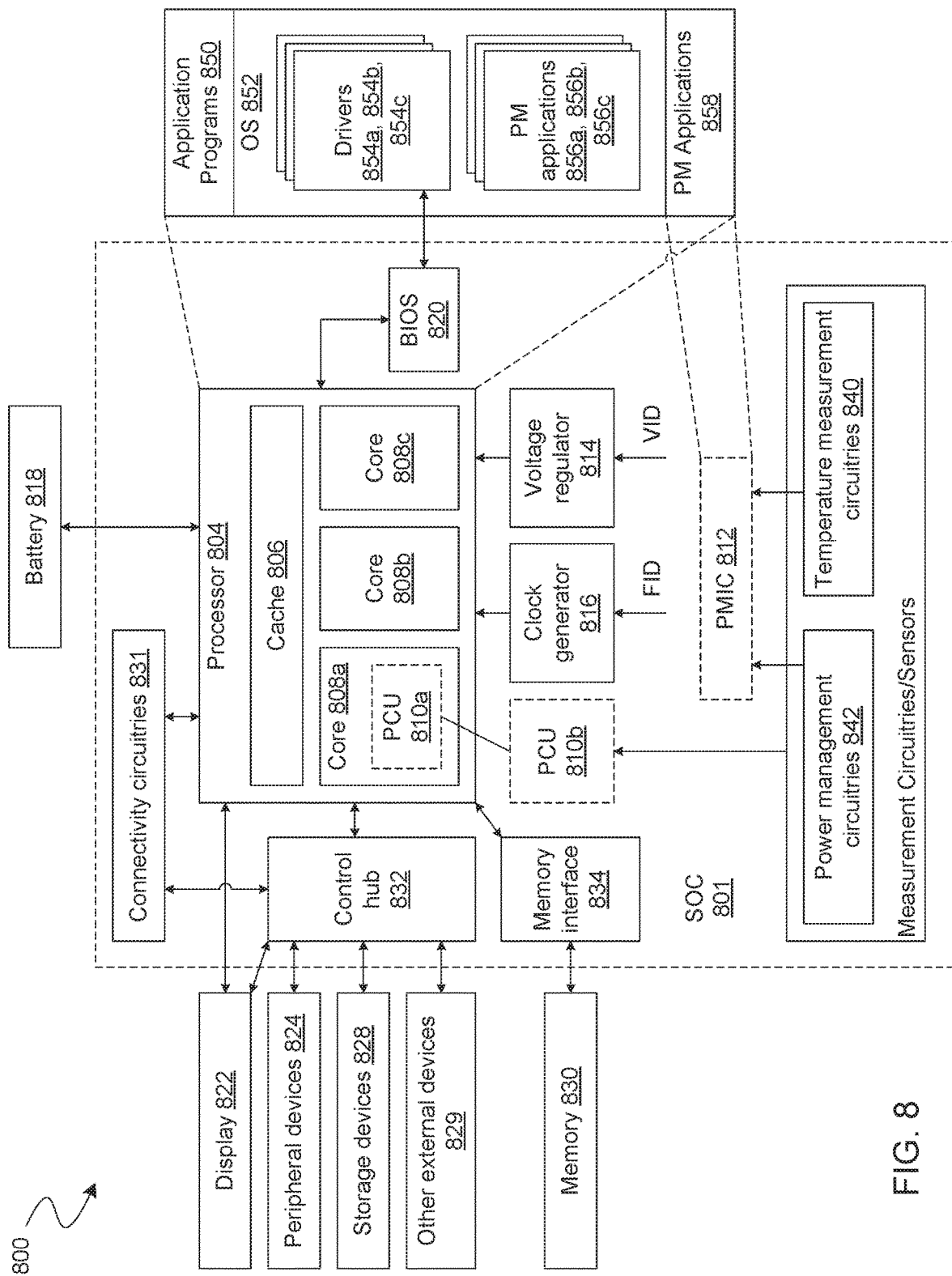
FIG. 8 illustrates a functional block diagram showing features of an exemplary computing device, in accordance with one embodiment.

FIG. 8 illustrates a computer system or computing device 800 (also referred to as device 800) comprising circuitry, in accordance with some embodiments, which provides functionality to limit an amount of time for a power domain to enter (or reenter) a low power state. It is pointed out that those elements of FIG. 8 having the same reference numbers (or names) as the elements of any other figure can operate or function in any manner similar to that described, but are not limited to such.

In some embodiments, device 800 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 800.

In an example, the device 800 comprises an SoC (System-on-Chip) 801. An example boundary of the SOC 801 is illustrated using dotted lines in FIG. 8, with some example components being illustrated to be included within SOC 801—however, SOC 801 may include any appropriate components of device 800.

In some embodiments, device 800 includes processor 804. Processor 2110 can include one or more physical devices, such as microprocessors, application processors, microcontrollers, programmable logic devices, processing cores, or other processing means. The processing operations performed by processor 804 include the execution of an operating platform or operating system on which applications and/or device functions are executed. The processing operations include operations related to I/O (input/output) with a human user or with other devices, operations related to power management, operations related to connecting computing device 800 to another device, and/or the like. The processing operations may also include operations related to audio I/O and/or display I/O.

In some embodiments, processor 804 includes multiple processing cores (also referred to as cores) 808*a*, 808*b*, 808*c*. Although merely three cores 808*a*, 808*b*, 808*c* are illustrated in FIG. 8, the processor 804 may include any other appropriate number of processing cores, e.g., tens, or even hundreds of processing cores. Processor cores 808*a*, 808*b*, 808*c* may be implemented on a single integrated circuit (IC) chip. Moreover, the chip may include one or more shared and/or private caches, buses or interconnections, graphics and/or memory controllers, or other components.

In some embodiments, processor 804 includes cache 806. In an example, sections of cache 806 may be dedicated to individual cores 808 (e.g., a first section of cache 806 dedicated to core 808*a*, a second section of cache 806 dedicated to core 808*b*, and so on). In an example, one or more sections of cache 806 may be shared among two or more of cores 808. Cache 806 may be split in different levels, e.g., level 1 (L1) cache, level 2 (L2) cache, level 3 (L3) cache, etc.

In some embodiments, processor core 804 may include a fetch unit to fetch instructions (including instructions with conditional branches) for execution by the core 804. The instructions may be fetched from any storage devices such as the memory 830. Processor core 804 may also include a decode unit to decode the fetched instruction. For example, the decode unit may decode the fetched instruction into a plurality of micro-operations. Processor core 804 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 804 may be an out-of-order processor core in one embodiment. Processor core 804 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 804 may also include a bus unit to enable communication between components of the processor core 804 and other components via one or more buses. Processor core 804 may also include one or more registers to store data accessed by various components of the core 804 (such as values related to assigned app priorities and/or sub-system states (modes) association.

In some embodiments, device 800 comprises connectivity circuitries 831. For example, connectivity circuitries 831 includes hardware devices (e.g., wireless and/or wired connectors and communication hardware) and/or software components (e.g., drivers, protocol stacks), e.g., to enable device 800 to communicate with external devices. Device 800 may be separate from the external devices, such as other computing devices, wireless access points or base stations, etc.

In an example, connectivity circuitries 831 may include multiple different types of connectivity. To generalize, the connectivity circuitries 831 may include cellular connectivity circuitries, wireless connectivity circuitries, etc. Cellular connectivity circuitries of connectivity circuitries 831 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 831 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 831 may include a network interface, such as a wired or wireless interface, e.g., so that a system embodiment may be incorporated into a wireless device, for example, cell phone or personal digital assistant.

In some embodiments, device 800 comprises control hub 832, which represents hardware devices and/or software components related to interaction with one or more I/O devices. For example, processor 804 may communicate with one or more of display 822, one or more peripheral devices 824, storage devices 828, one or more other external devices 829, etc., via control hub 832. Control hub 832 may be a chipset, a Platform Control Hub (PCH), and/or the like.

For example, control hub 832 illustrates one or more connection points for additional devices that connect to device 800, e.g., through which a user might interact with the system. For example, devices (e.g., devices 829) that can be attached to device 800 include microphone devices, speaker or stereo systems, audio devices, video systems or other display devices, keyboard or keypad devices, or other I/O devices for use with specific applications such as card readers or other devices.

As mentioned above, control hub 832 can interact with audio devices, display 822, etc. For example, input through a microphone or other audio device can provide input or commands for one or more applications or functions of device 800. Additionally, audio output can be provided instead of, or in addition to display output. In another example, if display 822 includes a touch screen, display 822 also acts as an input device, which can be at least partially managed by control hub 832. There can also be additional buttons or switches on computing device 800 to provide I/O functions managed by control hub 832. In one embodiment, control hub 832 manages devices such as accelerometers, cameras, light sensors or other environmental sensors, or other hardware that can be included in device 800. The input can be part of direct user interaction, as well as providing environmental input to the system to influence its operations (such as filtering for noise, adjusting displays for brightness detection, applying a flash for a camera, or other features).

In some embodiments, control hub 832 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 822 represents hardware (e.g., display devices) and software (e.g., drivers) components that provide a visual and/or tactile display for a user to interact with device 800. Display 822 may include a display interface, a display screen, and/or hardware device used to provide a display to a user. In some embodiments, display 822 includes a touch screen (or touch pad) device that provides both output and input to a user. In an example, display 822 may communicate directly with the processor 804. Display 822 can be one or more of an internal display device, as in a mobile electronic device or a laptop device or an external display device attached via a display interface (e.g., DisplayPort, etc.). In one embodiment display 822 can be a head mounted display (HMD) such as a stereoscopic display device for use in virtual reality (VR) applications or augmented reality (AR) applications.

In some embodiments and although not illustrated in the figure, in addition to (or instead of) processor 804, device 800 may include Graphics Processing Unit (GPU) comprising one or more graphics processing cores, which may control one or more aspects of displaying contents on display 822.

Control hub 832 (or platform controller hub) may include hardware interfaces and connectors, as well as software components (e.g., drivers, protocol stacks) to make peripheral connections, e.g., to peripheral devices 824.

It will be understood that device 800 could both be a peripheral device to other computing devices, as well as have peripheral devices connected to it. Device 800 may have a "docking" connector to connect to other computing devices for purposes such as managing (e.g., downloading and/or uploading, changing, synchronizing) content on device 800. Additionally, a docking connector can allow device 800 to connect to certain peripherals that allow computing device 800 to control content output, for example, to audiovisual or other systems.

In addition to a proprietary docking connector or other proprietary connection hardware, device 800 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 831 may be coupled to control hub 832, e.g., in addition to, or instead of, being coupled directly to the processor 804. In some embodiments, display 822 may be coupled to control hub 832, e.g., in addition to, or instead of, being coupled directly to processor 804.

In some embodiments, device 800 comprises memory 830 coupled to processor 804 via memory interface 834. Memory 830 includes memory devices for storing information in device 800. Memory can include nonvolatile (state does not change if power to the memory device is interrupted) and/or volatile (state is indeterminate if power to the memory device is interrupted) memory devices. Memory device 830 can be a dynamic random access memory (DRAM) device, a static random access memory (SRAM) device, flash memory device, phase-change memory device, or some other memory device having suitable performance to serve as process memory. In one embodiment, memory 830 can operate as system memory for device 800, to store data and instructions for use when the one or more processors 804 executes an application or process. Memory 830 can store application data, user data, music, photos, documents, or other data, as well as system data (whether long-term or temporary) related to the execution of the applications and functions of device 800.

Elements of various embodiments and examples are also provided as a machine-readable medium (e.g., memory 830) for storing the computer-executable instructions (e.g., instructions to implement any other processes discussed herein). The machine-readable medium (e.g., memory 830) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 800 comprises temperature measurement circuitries 840, e.g., for measuring temperature of various components of device 800. In an example, temperature measurement circuitries 840 may be embedded, or coupled or attached to various components, whose temperature are to be measured and monitored. For example, temperature measurement circuitries 840 may measure temperature of (or within) one or more of cores 808a, 808b, 808c, voltage regulator 814, memory 830, a mother-board of SOC 801, and/or any appropriate component of device 800.

In some embodiments, device 800 comprises power measurement circuitries 842, e.g., for measuring power consumed by one or more components of the device 800. In an example, in addition to, or instead of, measuring power, the power measurement circuitries 842 may measure voltage and/or current. In an example, the power measurement circuitries 842 may be embedded, or coupled or attached to various components, whose power, voltage, and/or current consumption are to be measured and monitored. For example, power measurement circuitries 842 may measure power, current and/or voltage supplied by one or more voltage regulators 814, power supplied to SOC 801, power supplied to device 800, power consumed by processor 804 (or any other component) of device 800, etc.

In some embodiments, device 800 comprises one or more voltage regulator circuitries, generally referred to as voltage regulator (VR) 814. VR 814 generates signals at appropriate voltage levels, which may be supplied to operate any appropriate components of the device 800. Merely as an example, VR 814 is illustrated to be supplying signals to processor 804 of device 800. In some embodiments, VR 814 receives one or more Voltage Identification (VID) signals, and generates the voltage signal at an appropriate level, based on the VID signals. Various type of VRs may be utilized for the VR 814. For example, VR 814 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 810a/b and/or PMIC 812. In some embodiments, each core has a network of distributed LDOs to provide efficient control for power management. The LDOs can be digital, analog, or a combination of digital or analog LDOs.

In some embodiments, device 800 comprises one or more clock generator circuitries, generally referred to as clock generator 816. Clock generator 816 generates clock signals at appropriate frequency levels, which may be supplied to any appropriate components of device 800. Merely as an example, clock generator 816 is illustrated to be supplying clock signals to processor 804 of device 800. In some embodiments, clock generator 816 receives one or more Frequency Identification (FID) signals, and generates the clock signals at an appropriate frequency, based on the FID signals.

In some embodiments, device 800 comprises battery 818 supplying power to various components of device 800. Merely as an example, battery 818 is illustrated to be supplying power to processor 804. Although not illustrated in the figures, device 800 may comprise a charging circuitry, e.g., to recharge the battery, based on Alternating Current (AC) power supply received from an AC adapter.

In some embodiments, device 800 comprises Power Control Unit (PCU) 810 (also referred to as Power Management Unit (PMU), Power Controller, etc.). In an example, some sections of PCU 810 may be implemented by one or more processing cores 808, and these sections of PCU 810 are symbolically illustrated using a dotted box and labelled PCU 810a. In an example, some other sections of PCU 810 may be implemented outside the processing cores 808, and these sections of PCU 810 are symbolically illustrated using a dotted box and labelled as PCU 810b. PCU 810 may implement various power management operations for device 800. PCU 810 may include hardware interfaces, hardware circuitries, connectors, registers, etc., as well as software components (e.g., drivers, protocol stacks), to implement various power management operations for device 800.

In some embodiments, device 800 comprises Power Management Integrated Circuit (PMIC) 812, e.g., to implement various power management operations for device 800. In some embodiments, PMIC 812 is a Reconfigurable Power Management ICs (RPMICs) and/or an IMVP (Intel® Mobile Voltage Positioning). In an example, the PMIC is within an IC chip separate from processor 804. The may implement various power management operations for device 800. PMIC 812 may include hardware interfaces, hardware circuitries, connectors, registers, etc., as well as software components (e.g., drivers, protocol stacks), to implement various power management operations for device 800.

In an example, device 800 comprises one or both PCU 810 or PMIC 812. In an example, any one of PCU 810 or PMIC 812 may be absent in device 800, and hence, these components are illustrated using dotted lines.

Various power management operations of device 800 may be performed by PCU 810, by PMIC 812, or by a combination of PCU 810 and PMIC 812. For example, PCU 810 and/or PMIC 812 may select a power state (e.g., P-state) for various components of device 800. For example, PCU 810 and/or PMIC 812 may select a power state (e.g., in accordance with the ACPI (Advanced Configuration and Power Interface) specification) for various components of device 800. Merely as an example, PCU 810 and/or PMIC 812 may cause various components of the device 800 to transition to a sleep state, to an active state, to an appropriate C state (e.g., C0 state, or another appropriate C state, in accordance with the ACPI specification), etc. In an example, PCU 810 and/or PMIC 812 may control a voltage output by VR 814 and/or a frequency of a clock signal output by the clock generator, e.g., by outputting the VID signal and/or the FID signal, respectively. In an example, PCU 810 and/or PMIC 812 may control battery power usage, charging of battery 818, and features related to power saving operation.

The clock generator 816 can comprise a phase locked loop (PLL), frequency locked loop (FLL), or any suitable clock source. In some embodiments, each core of processor 804 has its own clock source. As such, each core can operate at a frequency independent of the frequency of operation of the other core. In some embodiments, PCU 810 and/or PMIC 812 performs adaptive or dynamic frequency scaling or adjustment. For example, clock frequency of a processor core can be increased if the core is not operating at its maximum power consumption threshold or limit. In some embodiments, PCU 810 and/or PMIC 812 determines the operating condition of each core of a processor, and opportunistically adjusts frequency and/or power supply voltage of that core without the core clocking source (e.g., PLL of that core) losing lock when the PCU 810 and/or PMIC 812 determines that the core is operating below a target performance level. For example, if a core is drawing current from a power supply rail less than a total current allocated for that core or processor 804, then PCU 810 and/or PMIC 812 can temporarily increase the power draw for that core or processor 804 (e.g., by increasing clock frequency and/or power supply voltage level) so that the core or processor 804 can perform at a higher performance level. As such, voltage and/or frequency can be increased temporarily for processor 804 without violating product reliability.

In an example, PCU 810 and/or PMIC 812 may perform power management operations, e.g., based at least in part on receiving measurements from power measurement circuitries 842, temperature measurement circuitries 840, charge level of battery 818, and/or any other appropriate information that may be used for power management. To that end, PMIC 812 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 810 and/or PMIC 812 in at least one embodiment to allow PCU 810 and/or PMIC 812 to manage processor core energy at least in part based on value(s) detected by one or more of the sensors.

Also illustrated is an example software stack of device 800 (although not all elements of the software stack are illustrated). Merely as an example, processors 804 may execute application programs 850, Operating System 852, one or more Power Management (PM) specific application programs (e.g., generically referred to as PM applications 858), and/or the like. PM applications 858 may also be executed by the PCU 810 and/or PMIC 812. OS 852 may also include one or more PM applications 856a, 856b, 856c. The OS 852 may also include various drivers 854a, 854b, 854c, etc., some of which may be specific for power management purposes. In some embodiments, device 800 may further comprise a Basic Input/Output System (BIOS) 820. BIOS 820 may communicate with OS 852 (e.g., via one or more drivers 854), communicate with processors 804, etc.

For example, one or more of PM applications 858, 856, drivers 854, BIOS 820, etc. may be used to implement power management specific tasks, e.g., to control voltage and/or frequency of various components of device 800, to control wake-up state, sleep state, and/or any other appropriate power state of various components of device 800, control battery power usage, charging of the battery 818, features related to power saving operation, etc.

In some embodiments, power management circuitry which is coupled (and external) to processor 804—e.g., the power management circuitry comprising circuit logic of PCU 810b and/or PMIC 812—provides functionality to facilitate transitions by a power domain between various power states. The power domain comprises processor 804, and (for example) one of the power states disables or otherwise prevents execution of OS 852 with processor 804. In one such embodiment, the power management circuitry is coupled to receive from OS 852 a signal indicating that OS 852 will be able to accommodate a transition to such a power state. Based on the signal, the power management circuitry signals one or more devices of device 800 to successively attempt one or more transitions to the power state until one such attempted transition takes longer than some predetermined threshold period of time, or until the power domain is otherwise outside of the power domain for longer than the threshold period of time. Where the threshold period of time is so exceeded, the power management circuitry generates one or more signals to bring the power domain into a power state which (for example) enables execution of OS 852 to resume.

Figure 9:
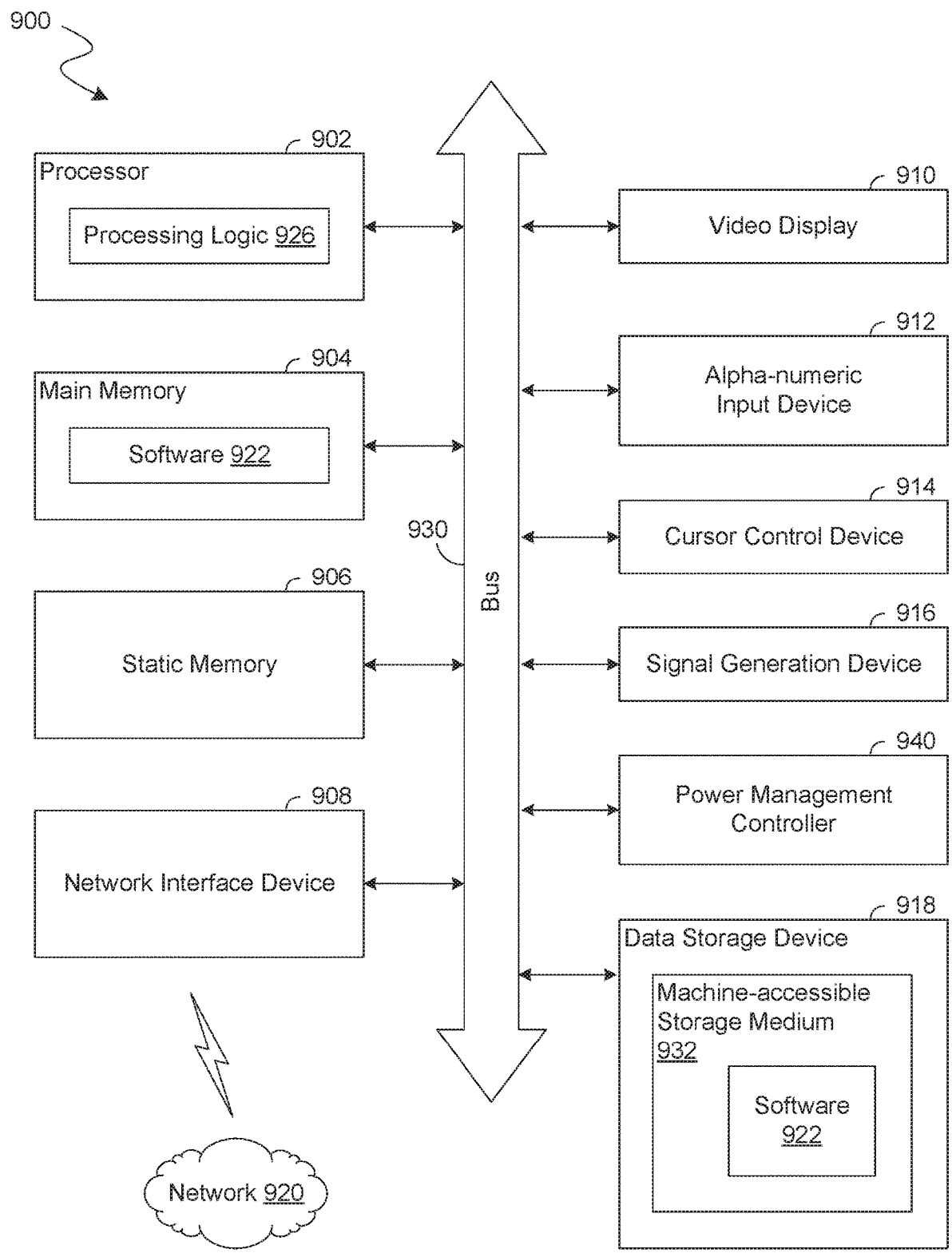
FIG. 9 illustrates a functional block diagram showing features of an exemplary computer system, in accordance with one embodiment.

FIG. 9 illustrates a diagrammatic representation of a machine in the exemplary form of a computer system 900 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations described herein.

The computer system 900 may further include a network interface device 908. The computer system 900 also may include a video display unit 910 (e.g., a liquid crystal display (LCD), a light emitting diode display (LED), or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-accessible storage medium (or more specifically a computer-readable storage medium) 932 on which is stored one or more sets of instructions (e.g., software 922) embodying any one or more of the methodologies or functions described herein. The software 922 may also reside, completely or at least partially, within the main memory 904 and/or within the processor 902 during execution thereof by the computer system 900, the main memory 904 and the processor 902 also constituting machine-readable storage media. The software 922 may further be transmitted or received over a network 920 via the network interface device 908.

While the machine-accessible storage medium 932 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Computer system 900 further comprises a power management controller 940 to provide power management functionality as described herein. In some embodiments, power management controller 940 is coupled to detect—based on one or more signals received from processor 902, for example—that an operating system of software 922 (the operating system executed with processing logic 926) will be able to accommodate a transition to power state of a power domain which includes processor 902. The power state is one which, for example, disables or otherwise prevents execution of the operating system with processor 902. In response to such detecting, power management controller 940 signals one or more devices of computer system 900 to successively attempt one or more transitions to the power state until one such attempted transition takes longer than some predetermined threshold period of time, or until the power domain is otherwise outside of the power domain for longer than the threshold period of time. Where the threshold period of time is so exceeded, power management controller 940 generates one or more signals to bring the power domain into a power state which (for example) enables execution of the operating system.

Techniques and architectures for controlling power usage by circuit devices are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit (IC) comprising:
   first circuitry to couple the IC to devices of a power domain;
   second circuitry, coupled to the first circuitry, to signal the devices to enable a transition of the power domain to a first power state during an instance of a second power state at a processor of the devices; and
   third circuitry coupled to the second circuitry, wherein, where an attempt by the power domain to enter the first power state fails to complete before an expiration of a first time limit, the third circuitry is to send a message to the devices based on the expiration of the first time limit, otherwise the third circuitry is to:

detect that an expiration of a second time limit occurs both after an exit from the first power state, and before the power domain reenters the first power state; and send the message to the devices based on the expiration of the second time limit;

wherein the processor is to end the instance of the second power state based on the message.

2. The IC of claim 1, the second circuitry further to signal the devices to enable a second transition of the power domain to a third power state, the second transition during an instance of a fourth power state at the processor;

wherein, where a second attempt by the power domain to enter the third power state fails to complete before an expiration of a third time limit, the third circuitry is to send a second message to the devices based on the expiration of the third time limit, otherwise the third circuitry is to:

detect that an expiration of a fourth time limit occurs both after an exit from the third power state, and before the power domain reenters the third power state; and send the second message to the devices based on the expiration of the fourth time limit; and wherein the processor is to end the second instance of the fourth power state based on the second message.

3. The IC of claim 1, further comprising fourth circuitry to:

generate information based on one or more attempts by the power domain to enter the first power state during the instance of the second power state at the processor, wherein the information identifies one of:

a duration of an instance of the power domain being in the first power state; or a duration of an instance of the power domain being in another power state; and communicate the information to one of the devices after the instance of the second power state.

4. The IC of claim 1, the second circuitry further to receive via the first circuitry a signal from an operating system (OS) that is to be executed with the processor, the signal comprising an indication that the OS is able to accommodate the transition;

wherein the second circuitry is to signal the devices, based on the indication, to enable the transition.

5. The IC of claim 1, the third circuitry further to determine, based on a threshold period of time, a duration of the first time limit and a duration of the second time limit, wherein the threshold period of time is a default period of time.

6. The IC of claim 1, the third circuitry further to:

determine, based on a threshold period of time, a duration of one of the first time limit or the second time limit; and update the threshold period of time based on a metric of a performance of the devices.

7. The IC of claim 1, wherein the third circuitry is to monitor multiple attempts by the power domain to reenter the first power state during the instance of the second power state, wherein the expiration of the second time limit occurs before a completion of a last attempt of the multiple attempts.

8. The IC of claim 1, wherein the third circuitry is to determine the first time limit, including the third circuitry to:

start a timer in response to an initiation of a first attempt by the power domain to enter the first power state; and stop the timer in response to a completion of the first attempt.

9. The IC of claim 8, wherein the third circuitry is to determine the second time limit, including the third circuitry to:

reset the timer based on the completion of the first attempt;

restart the timer in response to an initiation of a second attempt by the power domain to enter the first power state; and stop the timer in response to a completion of the second attempt.

10. A system-on-chip (SOC) comprising:

multiple devices of a power domain, the multiple devices comprising a processor;

first circuitry coupled to monitor one or more attempts to provide a first power state of the power domain, the one or more attempts during an instance of a second power state of the processor;

second circuitry coupled to the first circuitry, the second circuitry to communicate a message to the multiple devices based on the one or more attempts, wherein, where an expiration of a first time limit occurs before a completion of an initial attempt of the one or more attempts, the second circuitry is to generate the message based on a failure of the initial attempt, otherwise the second circuitry is to generate the message based on an expiration of a second time limit while the power domain is in a power state other than the first power state, wherein the expiration of a second time limit is after a success of the initial attempt;

wherein based on the message, the processor is to exit the second power state.

11. The SOC of claim 10, further comprising third circuitry to:

generate information based on one or more attempts by the power domain to enter the first power state during the instance of the second power state at the processor, wherein the information identifies one of:

a duration of an instance of the power domain being in the first power state; or a duration of an instance of the power domain being in another power state; and communicate the information to one of the devices after the instance of the second power state.

12. The SOC of claim 10, the first circuitry further to receive via the first circuitry a signal from an operating system (OS) that is to be executed with the processor, the signal comprising an indication that the OS is able to accommodate the transition;

wherein the second circuitry is to signal the devices, based on the indication, to enable a transition of the power domain to the first power state.

13. The SOC of claim 10, the second circuitry further to:

determine, based on a threshold period of time, a duration of one of the first time limit or the second time limit; and update the threshold period of time based on a metric of a performance of the devices.

14. The SOC of claim 10, wherein the third circuitry is to determine the first time limit, including the third circuitry to:

start a timer in response to an initiation of a first attempt by the power domain to enter the first power state; and stop the timer in response to a completion of the first attempt.

15. The SOC of claim 14, wherein the third circuitry is to determine the second time limit, including the third circuitry to:
- reset the timer based on the completion of the first attempt;
- restart the timer in response to an initiation of a second attempt by the power domain to enter the first power state; and
- stop the timer in response to a completion of the second attempt.

16. A system comprising:
- an integrated circuit (IC) chip comprising:
    - multiple devices of a power domain, the multiple devices comprising a processor;
    - first circuitry coupled to monitor one or more attempts to provide a first power state of the power domain, the one or more attempts during an instance of a second power state of the processor;
    - second circuitry coupled to the first circuitry, the second circuitry to communicate a message to the multiple devices based on the one or more attempts, wherein, where an expiration of a first time limit occurs before a completion of an initial attempt of the one or more attempts, the second circuitry is to generate the message based on a failure of the initial attempt, otherwise the second circuitry is to generate the message based on an expiration of a second time limit while the power domain is in a power state other than the first power state, wherein the expiration of a second time limit is after a success of the initial attempt;
- wherein based on the message, the processor is to exit the second power state; and
- a display device coupled to the IC chip, the display device to display an image based on a signal communicated with the IC chip.

17. The system of claim 16, the IC chip further comprising third circuitry to:
- generate information based on one or more attempts by the power domain to enter the first power state during the instance of the second power state at the processor, wherein the information identifies one of:
    - a duration of an instance of the power domain being in the first power state; or
    - a duration of an instance of the power domain being in another power state; and
- communicate the information to one of the devices after the instance of the second power state.

18. The system of claim 16, the first circuitry further to receive via the first circuitry a signal from an operating system (OS) that is to be executed with the processor, the signal comprising an indication that the OS is able to accommodate the transition;
- wherein the second circuitry is to signal the devices, based on the indication, to enable a transition of the power domain to the first power state.

19. The system of claim 16, the second circuitry further to determine, based on a threshold period of time, a duration of the first time limit and a duration of the second time limit, wherein the threshold period of time is a default period of time.

20. The system of claim 16, wherein the second circuitry is to monitor multiple attempts by the power domain to reenter the first power state during the instance of the second power state, wherein the expiration of the second time limit occurs before a completion of a last attempt of the multiple attempts.

* * * * *